(12) United States Patent
Fischer et al.

(10) Patent No.: US 8,430,233 B2
(45) Date of Patent: Apr. 30, 2013

(54) METHOD FOR TRANSPORTING WORKPIECE CARRIERS ON AN ASSEMBLY LINE, WORKPIECE CARRIER AND ASSEMBLY UNIT

(75) Inventors: Sascha Fischer, Taichung (TW); Peter Grosser, Höchstadt (DE); Gerhard Heinemann, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 61 days.

(21) Appl. No.: 12/225,089

(22) PCT Filed: Jan. 26, 2007

(86) PCT No.: PCT/EP2007/050761
§ 371 (c)(1),
(2), (4) Date: Sep. 12, 2008

(87) PCT Pub. No.: WO2007/104597
PCT Pub. Date: Sep. 20, 2007

(65) Prior Publication Data
US 2010/0314215 A1  Dec. 16, 2010

(30) Foreign Application Priority Data
Mar. 15, 2006 (DE) .......................... 10 2006 011 974

(51) Int. Cl.
*B65G 17/46* (2006.01)
*B65G 5/28* (2006.01)
*B23Q 5/28* (2006.01)

(52) U.S. Cl.
USPC ............... 198/805; 198/465.1; 198/343.1; 198/867.01; 29/822

(58) Field of Classification Search .................. None
See application file for complete search history.

(56) References Cited

U.S. PATENT DOCUMENTS

| | | | | | |
|---|---|---|---|---|---|
| 5,437,361 | A | * | 8/1995 | Ohmori et al. | 198/465.1 |
| 5,675,195 | A | * | 10/1997 | Takei | 310/12.21 |
| 2005/0061195 | A1 | * | 3/2005 | Lutz et al. | 104/290 |

FOREIGN PATENT DOCUMENTS

| | | |
|---|---|---|
| DE | 41 34 100 A1 | 4/1992 |
| DE | 101 50 319 C1 | 5/2003 |
| DE | 10150319 C1 | 5/2003 |
| DE | 102004045992 A1 | 4/2006 |
| EP | 0491823 B1 | 8/1994 |
| EP | 1 428 613 A1 | 6/2004 |
| GB | 2 343 997 A | 5/2000 |
| JP | 61081104 A | 4/1986 |
| JP | 61098170 A | 5/1986 |
| WO | WO 87/07453 A1 | 12/1987 |

OTHER PUBLICATIONS

Communication from the German Patent Office listing cited references, pp. 1-8.

* cited by examiner

*Primary Examiner* — Kavel Singh

(57) ABSTRACT

The transport of work carriers on an assembly line is performed by the use of novel linear motors in which the primary part has both solenoids and permanent magnets and in which the secondary part has no permanent magnets of its own. By the provision of a magnetically soft plate, a work carrier has uniformly spaced clearances with respect to the secondary part and can be moved by the suitably arranged primary part. On an assembly line, it can be provided that the primary parts supplement the unction of an existing transporting bet. It may also be provided that a transporting belt is completely replaced by such primary parts.

16 Claims, 4 Drawing Sheets

METHOD FOR TRANSPORTING WORKPIECE CARRIERS ON AN ASSEMBLY LINE, WORKPIECE CARRIER AND ASSEMBLY UNIT

CROSS REFERENCE TO RELATED APPLICATIONS

This application is the US National Stage of International Application No. PCT/EP2007/050761, filed Jan. 26, 2007 and claims the benefit thereof. The International Application claims the benefits of German application No. 10 2006 011 974.6 DE filed Mar. 15, 2006, both of the applications are incorporated by reference herein in their entirety.

FIELD OF INVENTION

The invention relates to a method for transporting (moving) workpiece carriers in an assembly line. It relates also to a new type of workpiece carrier and a new type of assembly unit (assembly cell).

BACKGROUND OF INVENTION

An assembly line essentially consists of a plurality of assembly units, for example assembly cells. In the prior art a conveyor belt transports workpiece carriers from assembly cell to assembly cell. Workpieces are held in the workpiece carrier. The workpieces are processed in each assembly cell. An assembly cell usually contains at least one processing unit. One to four, typically two, manufacturing steps are usually carried out in one assembly cell. Also within the assembly cell the conveyor belt transports the workpiece carrier with the workpieces from processing unit to processing unit.

The conveyor belt is usually arranged to be continuous and moves uniformly. Naturally, in order to carry out a manufacturing step in a processing unit, the workpiece carrier must be prevented from continuing to move on the conveyor belt. For this, two steps are usually provided: electrically- or pneumatically-operated stoppers are mounted on an input side of the processing unit. The workpiece carrier is either removed from the conveyor belt by means of this stopper, or alternatively it is mechanically blocked so that the previous adhesion between the workpiece carrier and the conveyor belt is removed and the conveyor belt continues to move under the workpiece carriers while these are stopped.

The stoppers ensure that incoming workpiece carriers stop in front of the processing unit. Only one workpiece carrier reaches the processing unit at any one time. The other workpiece carriers wait at a distance from the processing unit until the current manufacturing step is completed. During the entire time the conveyor belt continues to run at constant speed. The workpiece carrier is now transferred from the input side into a processing position in the processing unit. In this connection, the conveyor belt is either used again or provision can also be made for a gripper arm or similar to place the workpiece carrier in the processing position. In order to hold the workpiece carrier in the processing position, special mechanical elements are provided, such as locating pins for example, which likewise have to be electrically or pneumatically actuated.

Precise processing of the workpiece can be carried out in the processing position. However, precise control of the position of the workpiece carrier is not possible in the prior art.

Until now, the tool is equipped with a servo-driven motion axis to facilitate movements in the transportation direction of the conveyor belt.

The use of electrically- or pneumatically-operated stoppers, as well as elements for locating the workpiece carrier in the processing unit, involves relatively high expenditure. Electrically- or pneumatically-operated components are susceptible to faults. Also, their faults can only be simulated and analyzed with difficulty via software. If a fault occurs, then this usually has to be laboriously located by the maintenance personnel.

The system is relatively inflexible, which makes it difficult to reset individual assembly cells. In particular, this is then a disadvantage if a basic assembly line set-up is used and different products are to be manufactured in not particularly large batch quantities at any one time, so that frequent modifications are necessary.

SUMMARY OF INVENTION

An object of the invention is to provide a method for transporting workpiece carriers in an assembly line, that is flexible, involves little maintenance outlay and yet can run as accurately as possible and at high speeds.

According to the invention, a method is provided as claimed in an independent claim, a workpiece carrier and an assembly unit as claimed in further independent claims.

The invention is based on the knowledge that modern linear motors can be used in assembly lines. Modern linear motors have a primary section in which are integrated not only the magnet coils but also the permanent magnets. The magnetic flux is always directed to the secondary section without the secondary section itself having to be permanently magnetic. A secondary section is provided by just a soft magnetic plate with a plurality of uniformly spaced recesses. The workpiece carrier is provided with such a plate, it being possible for this to be placed at any position as long as only the interaction with the primary section is guaranteed by the overall construction.

Only the primary section has to be suitably activated. Here, "activation" for the primary section is understood to be both the direct feed of supply currents for the magnet coils and also, in a somewhat more complicated construction, the supply of control signals for processing by a computer control unit, which subsequently results in corresponding current signals for the magnet coils. Differing from linear motors in which permanent magnets are provided in the secondary section, the present invention permits the use of modern linear motors to convey workpiece carriers in any assembly line, even in those where metallic swarf occurs. The latter would not be possible were the workpiece carrier to be permanently magnetic. In particular, the inventive workpiece carrier can also be used in work areas where no magnetism whatsoever is permitted.

The inventive workpiece carrier is not subject to any restrictions. With the exception of the soft magnetic plate, it can take any form. For example, several nests of workpieces can also be loaded onto each workpiece carrier.

In a preferred embodiment, acting in combination with the workpiece carrier as secondary section, the primary section undertakes the function of the aforementioned stopper. In other words, the primary section is controlled so that it stops a workpiece carrier that is arriving on the conveyor belt at one input side of the processing unit. The elimination of the stopper removes a source of malfunctions. The linear motor itself is less susceptible to faults. Maintenance costs are reduced as the linear motor is virtually maintenance-free. Faults in the process sequence can be simulated and analyzed via the software. Overall, the system is more flexible because all of the motion sequences are programmable.

It is therefore possible with a preferred embodiment that the primary section does not just bring the incoming workpiece carrier to an immediate halt, but that the speed of the workpiece carrier is continuously controlled to zero, for example linearly. In this connection, the primary section can cause the workpiece carrier to be decelerated very gently from the arrival speed to zero.

In a further preferred embodiment, the primary section also replaces the mechanical elements which have previously transferred the workpiece carrier from the input side of the processing unit to the processing position. Locating pins etc. are dispensed with because the primary section alone can hold the workpiece carrier in the processing position. It is then no longer imperative that the workpiece carrier be stopped at the input side.

Consequently, in said preferred embodiment, further components which in the prior art contributed to susceptibility to faults, are eliminated.

In a preferred embodiment the movement of the secondary section (workpiece carrier) by the primary section of the linear motor is produced not only by open-loop but also closed-loop control. Thus, in particular, in order to place the workpiece carrier in at least one desired position (for example in the above-mentioned transfer of the workpiece carrier to the processing position) at least one measured variable concerning a position and/or speed of the workpiece carrier is continuously or repeatedly determined. This measured variable is used (as the actual signal) during control of drive signals for the primary section. (In this case the presence of a suitable computer unit is assumed).

Highly accurate positioning of the workpiece carrier in a specific position is possible by means of the closed-loop control. The accuracy which can be achieved in this case is ten times higher than in mechanical-pneumatic solutions of the prior art.

The advantages of the use of a primary section with the inventive secondary section workpiece carrier are so numerous that in a further preferred embodiment the conveyor belt can be completely dispensed with. Instead, in the assembly line the transportation of workpiece carriers is carried out exclusively using primary sections. Naturally, an uninterrupted chain of primary sections then has to be provided along the entire assembly line, even between different processing units in the assembly cells and between the individual assembly cells (or their transition points). However, the concomitant outlay can be worthwhile because due to the exclusive use of linear motor primary sections, there is still only one transport system, which in comparison to the conveyor belt is less susceptible to faults.

As already stated, the (soft-magnetic) plate present on the inventive workpiece carrier has a plurality of uniformly spaced recesses which preferably are of the same type, in particular all of which (apart from the edge recesses) are of the same shape.

Here the plate can be perpendicular and extend upwards from a baseplate as a (single) wall of the workpiece carrier, so to speak.

Preferably, uniformly spaced markings are provided on the workpiece carrier (for example on the plate parallel to the recesses). These markings are used for detection by a position measuring sensor. For example, these can be small recesses which are given a coating of reflective paint in order to reflect light from a laser beam or an LED.

One aspect of the invention is also an assembly unit (for example an assembly cell) for use in an assembly line. Such an assembly unit has a processing unit and is characterized by at least one primary section of a linear motor, which includes a plurality of magnetic tracks and permanent magnets.

The primary section should be suitably positioned. For example, the assembly unit has a continuous conveyor belt, where continuous is understood to be that at an input side it accepts workpiece carriers from an adjacent assembly unit and delivers them at an output side to a further adjacent assembly unit. The primary section should then be positioned on the conveyor belt so that it can change the speed of a secondary section workpiece carrier of the inventive type that is arriving on the conveyor belt.

The primary section should be positioned so that it can place the workpiece carrier in a processing position of the processing unit.

BRIEF DESCRIPTION OF THE DRAWINGS

A preferred embodiment of the invention is described below with reference to the drawing, in which.

DETAILED DESCRIPTION OF INVENTION

Figure 1:
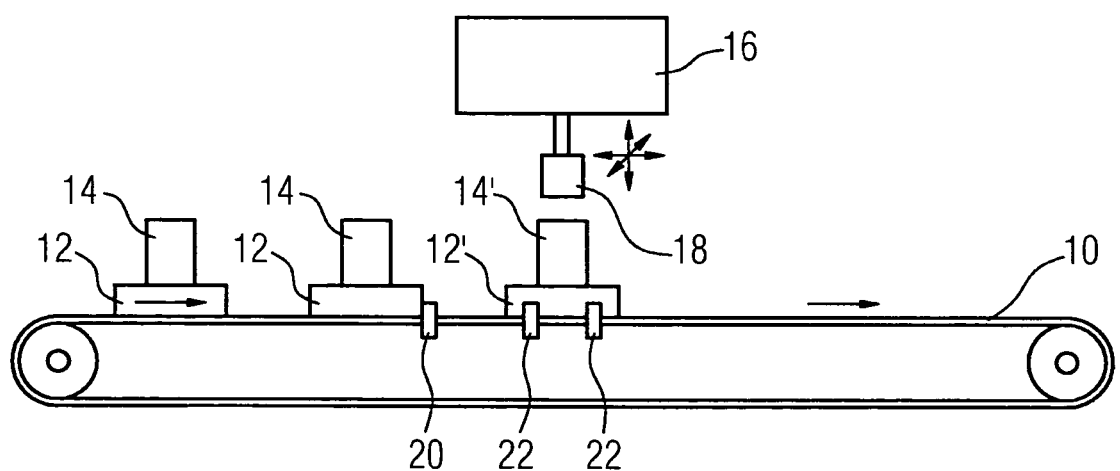
FIG. 1 illustrates a method for transporting workpieces in an assembly line according to the prior art.
Figure 2:
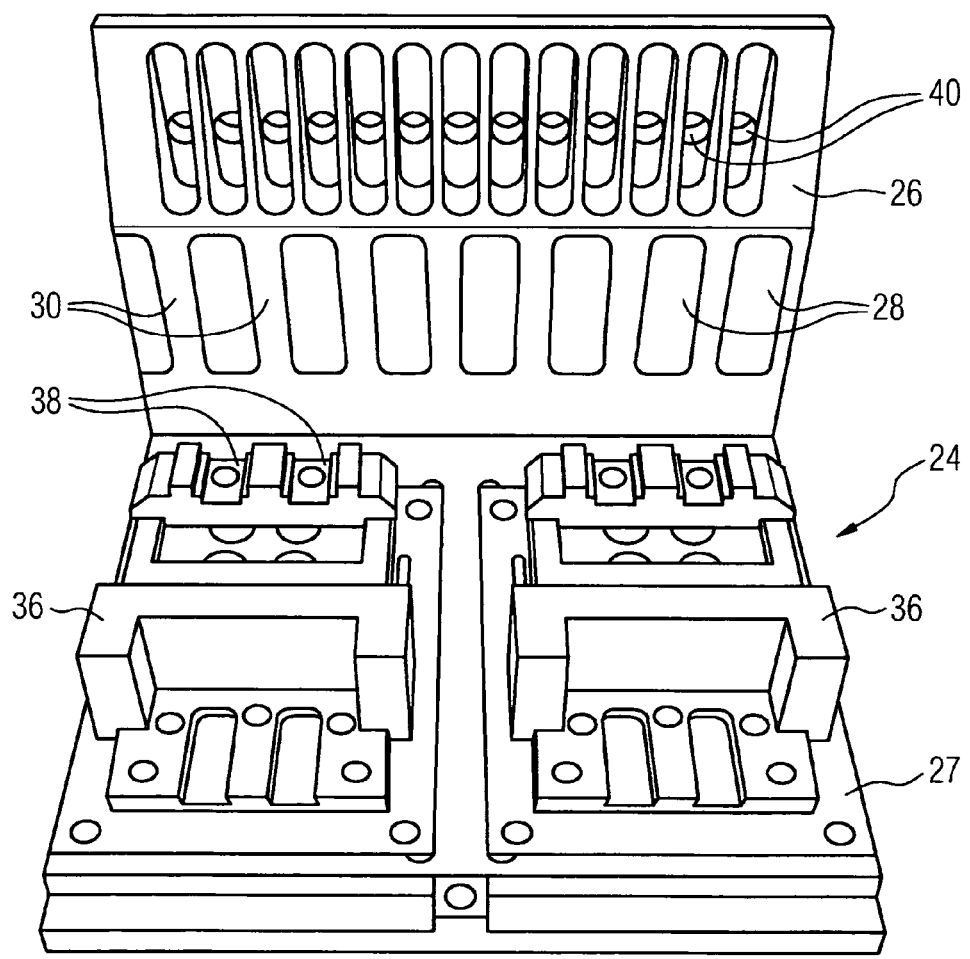
FIG. 2 is a perspective view of an inventive workpiece carrier.

FIG. 1 illustrates the insides of an assembly cell according to the prior art, in which a conveyor belt 10 transports a plurality of workpiece carriers 12 with workpieces 14 to a processing unit 16 and away from the latter. The processing unit 16 has a movable tool 18 (see arrows).

A mechanical, hydraulic or pneumatic stopper 20 is arranged at an input side of the processing unit 16 inside the assembly cell. This stopper acts mechanically on an incoming workpiece carrier 12 to prevent this arriving at a processing position in which a workpiece carrier 12' with tool 14' is presently located. The stopper 20 usually retains the workpiece carrier 12 and the conveyor belt 10 slides past under the workpiece carrier 12.

In the processing position the workpiece carrier 12' with the workpiece 14 is held with the aid of locating pins 22. The tool can thus act upon the workpiece 14' and the actual processing can take place.

The use of stoppers 20 and locating pins 22 is mechanically complicated and is often a source of malfunctions.

The invention may replace stoppers 20 and locating pins 22 with a linear motor arrangement.

A requirement for this is that a workpiece carrier 24 is provided that functions as the secondary section of a linear motor with excitation arranged at the primary side. A linear motor consists of a primary section that essentially takes on the role of the conventional stator, and the secondary section that takes on the role of a conventional rotor. In contrast to conventional linear motors, the primary section not only has magnet coils but also a plurality of permanent magnets. On the other hand the secondary section 24 has no permanent magnets. Instead, a plate 26, which here stands perpendicular to a baseplate 27 of the workpiece carrier 24, as a "side wall" so to speak, is provided on the secondary section, namely the workpiece carrier 24. The plate 26 consists of soft-magnetic material, for example suitable steel material, and has a plurality of recesses 28. The recesses 28 are uniformly spaced from each other, it being possible here for the recesses to be slightly wider than the webs 30 located between them. Here the recesses 28 have the shape of rounded rectangles, but other shapes are conceivable. With regard to this, references are to be made to publications relating to the linear motor with excitation arranged at the primary side, with earlier seniority.

Figure 3:
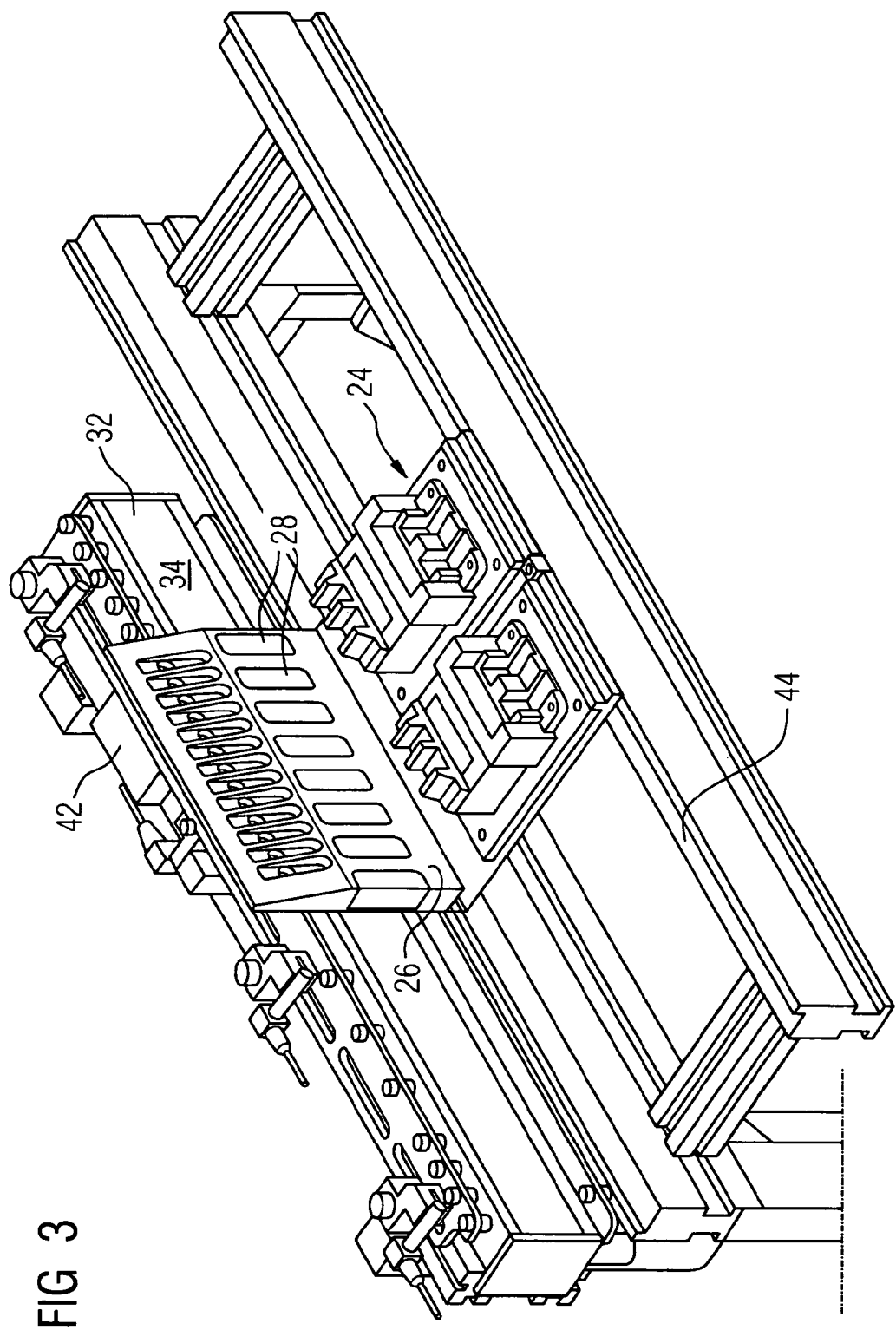
FIG. 3 shows a perspective view of the inside of an assembly cell with a primary section, the workpiece carrier as secondary section illustrated in FIG. 2, and a conveyor belt.

The recesses 28 with the webs 30 located between them switch the actual magnetic interaction. This can be seen in FIG. 3: here the primary section is shown as an elongated box 32. It is important that this elongated box has an active area 34 from which magnetic flux is emitted by magnet coils and permanent magnets inside the primary section 32, and interacts with the secondary section 24. Here the spaces between the recesses 28 of the workpiece carrier 24 typically correspond to the structural clearances between coils and permanent magnets inside the primary section 32 (not shown in FIG. 3).

Apart from the plate 26, in the conventional manner the workpiece carrier 24 has two so-called workpiece nests 36, each of which has retaining slots 38 for locating one (or two) workpieces. As a special feature, it should be mentioned that in addition to the recesses 28, further recesses are provided in the plate 26 above the recesses 28, and are denoted by 40 in the figure. The recesses 40 are used as markings for a so-called linear measuring system which is shown covered in FIG. 3 and denoted by 42. The linear measuring system 42 includes optical signal transmitters and sensors which measure whether an optical signal has been reflected back. If the workpiece carrier moves, then the recesses 40 also move. An optical signal is alternately reflected and then again not reflected. Due to a count, a suitable computer unit (not shown) "knows" the number of recesses 40 which have just moved past the linear measuring system 42, so that the position of the workpiece carrier can be precisely detected. The linear system can also operate magnetically (inductively) as an alternative to the use of optical signals.

Figure 4:
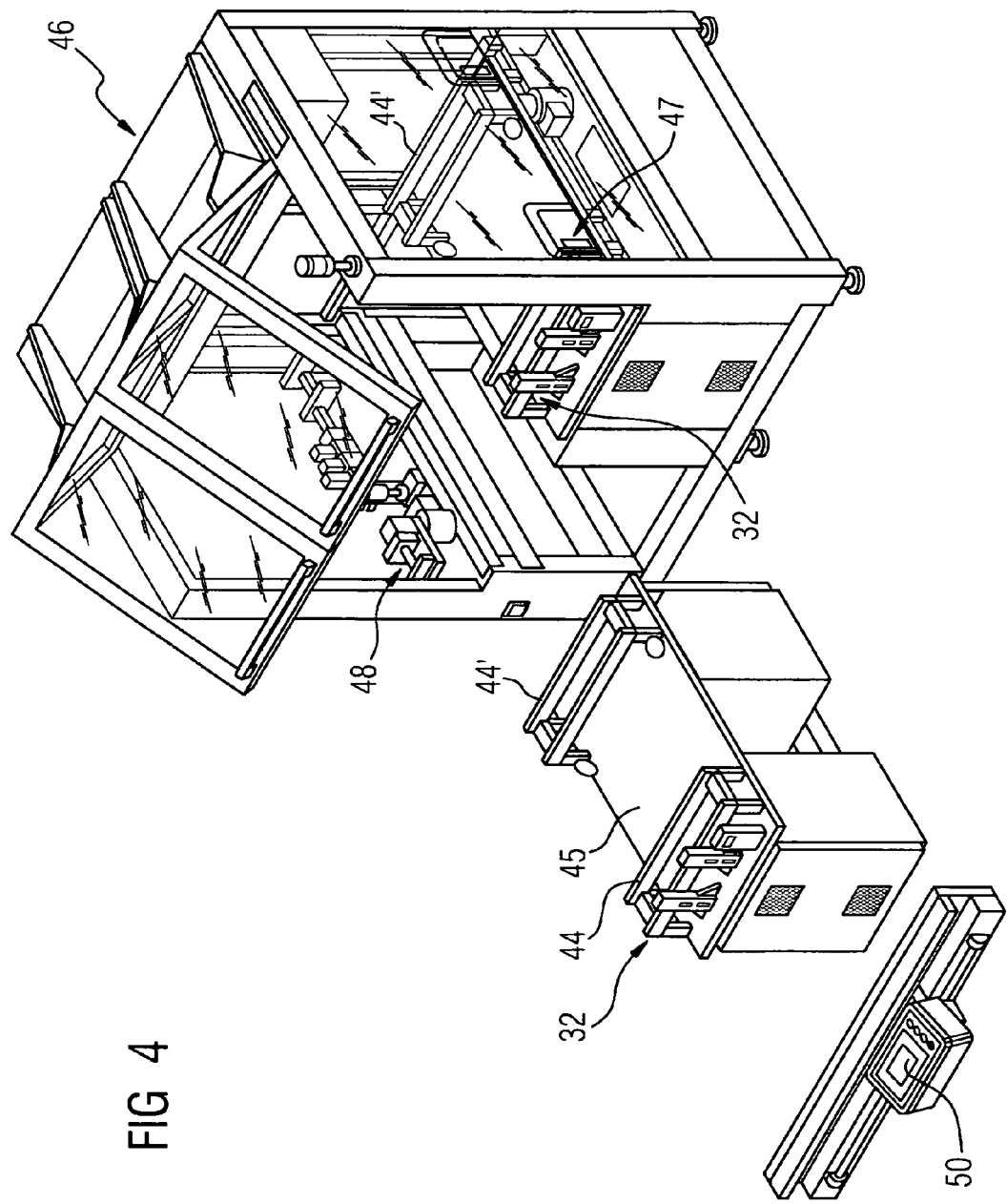
FIG. 4 illustrates schematically the construction of an inventive assembly cell.

The workpiece carrier is normally moved on a conveyor belt 44. An assembly cell corresponding to a typical form of construction is illustrated in FIG. 4. For reasons of clarity a table 45 with a primary section 32 is here shown removed from the opened assembly cell generally denoted by 46. The assembly cell 46 has an input side 47 and an output side 48. The construction is configured in such a way that identical assembly cells 46 can be placed immediately adjacent to each other, so that the input side 47 of one assembly cell is arranged as a continuation of the output side 48 of the other assembly cell. Consequently, a suitable conveyor belt 44 transports one workpiece carrier from assembly cell 46 to assembly cell 46. A processing unit is now located inside. For the sake of simpler illustration, such a processing unit is not shown in FIG. 4. Analogous to FIG. 1, where the processing unit 16 is shown, workpiece carriers 24 are now transported with the aid of the conveyor belt 44 to an input side of the processing unit. The primary section 32 is located here. Consequently, when the workpiece carrier 24 reaches the input side of the processing unit (not shown) via the input side 47 of the assembly cell 46, the situation illustrated in FIG. 3 occurs, in which the plate 26 can interact with the active face 34 of the primary section 32. The primary section 32 is activated accordingly and causes a deceleration of the workpiece carrier 24 compared to the speed of the conveyor belt 44. In other words, the primary section 32 takes on the task of moving or transporting the workpiece carrier 24, while the conveyor belt 44 continues to run unhindered. As the secondary section, the workpiece carrier 24 is then moved to the position shown in FIG. 3, for example. This can be the processing position. In this case the linear measuring system 42 can be employed for precise positioning: the respective position of the workpiece carrier 24 is measured, also its speed if necessary, and depending on this, corresponding control signals are generated for the primary section 32, so that the workpiece carrier 24 is precisely positioned accordingly.

In the assembly cell 46 according to FIG. 4, the workpiece carrier therefore reaches a processing position where a workpiece (not shown) on the work carrier 24 can be processed. As can be seen from FIG. 4, two units in form of a table 45 are provided in the assembly cell 46. Accordingly, two processing units (not shown) are also provided. A primary section 32 is correspondingly provided in each processing unit. The workpiece carrier 24 is moved between the primary sections 32 by means of the conveyor belt 44. Finally, the conveyor belt 44 also moves the workpiece carrier out of the assembly cell 46 again (via the output 48).

To complete the picture, it should only be mentioned that a second conveyor belt 44' is provided, which is used to transport the workpiece carrier 24 back to the starting point (it not being possible for any further processing units to approach during return transportation by means of the conveyor belt 44'). The last respective assembly cell 46 is connected to a U-shaped section of conveyor belt, which joins the conveyor belt 44 to the conveyor belt 44'. More accurately, the conveyor belt 44 and the conveyor belt 44' are one and the same conveyor belt which moves continuously.

A comparison between FIG. 1 and FIG. 4 makes it clear that the invention dispenses with the stoppers 20 and the locating elements 21, instead of which the primary section 32 is used. The primary section 32 requires much less maintenance and is considerably less susceptible to faults than the mechanical or pneumatic components 20, 22.

In a next step the conveyor belt 44 can also be completely eliminated and the workpiece carrier 24 can be completely transported with the aid of primary sections 32, which then naturally must be arranged immediately adjacent to one another in a continuous sequence.

The use of a primary section 32 also has the advantage that the workpiece carrier can be accurately positioned. The entire arrangement can be easily controlled by the use of a computer unit 50 (see FIG. 4).

The invention claimed is:

1. A method for transporting workpiece carriers in an assembly line, comprising:
   providing a primary section of a linear motor, wherein the primary section has a plurality of magnet coils and permanent magnets;
   providing a workpiece carrier, wherein the workpiece carrier has a soft magnetic plate with a plurality of uniformly spaced recesses to function as the secondary section of the linear motor, wherein the workpiece carrier does not include a permanent magnet; and
   activating the primary section such that a movement-changing force is exerted on the workpiece carrier.

2. The method as claimed in claim 1, wherein a plurality of processing units for processing at least one workpiece carried by a workpiece carrier are provided on the assembly line.

3. The method as claimed in claim 2, wherein the workpiece carrier is transported from one processing unit to the next processing with the aid of a conveyor belt.

4. The method as claimed in claim 3, wherein a primary section of the linear motor is activated such that it stops a workpiece carrier arriving at an input side, wherein the conveyor belt is continuously moving.

5. The method as claimed in claim 1, wherein a speed of the workpiece carrier is continuously controlled by the primary section from a transport speed to zero.

6. The method as claimed in claim 4, wherein a speed of the workpiece carrier is continuously controlled by the primary section from a transport speed to zero in a linear manner.

7. The method as claimed in claim 1, wherein the primary section transfers the workpiece carrier to a processing position without stopping it.

8. The method as claimed in claim 1, wherein, in order to place the workpiece carrier into at least one desired position, at least one measured variable concerning position or speed of the workpiece carrier is continuously or repeatedly determined and is used during control of drive signals for the primary section.

9. The method as claimed in claim 2, wherein, in order to place the workpiece carrier into at least one desired position, at least one measured variable concerning position and speed of the workpiece carrier is continuously or repeatedly determined and is used during control of drive signals for the primary section.

10. The method as claimed in claim 1, wherein in the assembly line the transportation of workpiece carriers is carried out exclusively using linear motor primary sections.

11. An assembly unit, comprising:
 a primary section of a linear motor, having a plurality of magnet coils and permanent magnets,
 wherein a workpiece carrier functions as a secondary section of the linear motor, the workpiece carrier comprising a soft magnetic plate with a plurality of uniformly spaced recesses, and
 wherein the primary section is activated such that a movement-changing force is exerted on the workpiece carrier.

12. The assembly unit as claimed in claim 11, wherein the assembly unit is an assembly cell for use in an assembly line having a processing unit.

13. The assembly unit as claimed in claim 11, further comprising a continuous conveyor belt which accepts a workpiece carrier at an input side and delivers it at an output side, wherein the primary section is positioned on the conveyor belt such that the speed of a workpiece carrier arriving on the conveyor belt is changeable.

14. The assembly unit as claimed in claim 11, wherein the primary section is positioned such that a workpiece carrier is placeable in a processing position of the processing unit.

15. The assembly unit as claimed in claim 12, wherein the primary section is positioned such that a workpiece carrier is placeable in a processing position of the processing unit.

16. The assembly unit as claimed in claim 13, wherein the primary section is positioned such that a workpiece carrier is placeable in a processing position of the processing unit.

* * * * *